US008849786B2

(12) United States Patent
Ebanks

(10) Patent No.: US 8,849,786 B2
(45) Date of Patent: *Sep. 30, 2014

(54) METHOD OF RANKING SEARCH RESULTS PRESENTED TO A USER OF A SOCIAL NETWORK SITE

(75) Inventor: Gordon A. Ebanks, New York, NY (US)

(73) Assignee: Customerforce.com, New York, NY (US)

( * ) Notice: Subject to any disclaimer, the term of this patent is extended or adjusted under 35 U.S.C. 154(b) by 103 days.

This patent is subject to a terminal disclaimer.

(21) Appl. No.: 13/230,887

(22) Filed: Sep. 13, 2011

(65) Prior Publication Data

US 2012/0005201 A1    Jan. 5, 2012

Related U.S. Application Data

(63) Continuation of application No. 12/640,092, filed on Dec. 17, 2009, now Pat. No. 8,019,743, which is a continuation of application No. 11/699,957, filed on Jan. 30, 2007, now Pat. No. 7,657,523.

(60) Provisional application No. 60/780,912, filed on Mar. 9, 2006.

(51) Int. Cl.
*G06F 17/30* (2006.01)

(52) U.S. Cl.
CPC ............................... *G06F 17/30867* (2013.01)
USPC ........... 707/706; 707/723; 707/728; 707/730; 707/731; 707/748

(58) Field of Classification Search
USPC .......................... 707/706–710, 723, 748–749
See application file for complete search history.

(56) References Cited

U.S. PATENT DOCUMENTS

| 6,308,175 | B1 | 10/2001 | Lang et al. |
| 6,574,616 | B1 | 6/2003 | Saghir |
| 6,775,664 | B2 | 8/2004 | Lang et al. |
| 7,069,308 | B2 | 6/2006 | Abrams |
| 7,117,254 | B2 | 10/2006 | Lunt et al. |
| 7,188,153 | B2 | 3/2007 | Lunt et al. |
| 7,693,827 | B2 * | 4/2010 | Zamir et al. ........... 707/999.003 |
| 7,783,632 | B2 * | 8/2010 | Richardson et al. .......... 707/727 |
| 2002/0065802 | A1 | 5/2002 | Uchiyama |
| 2002/0078045 | A1 | 6/2002 | Dutta |
| 2003/0093338 | A1 * | 5/2003 | Kim et al. ....................... 705/27 |
| 2004/0199419 | A1 * | 10/2004 | Kim et al. ....................... 705/14 |
| 2005/0159970 | A1 | 7/2005 | Buyukkokten et al. |
| 2005/0177385 | A1 | 8/2005 | Hull et al. |
| 2006/0167942 | A1 | 7/2006 | Lucas et al. |

(Continued)

*Primary Examiner* — Hanh Thai
(74) *Attorney, Agent, or Firm* — Brooks Kushman P.C.

(57) ABSTRACT

Method of presenting search results to a user of a social network site on the Internet, in which each user of the social network site has a user profile with information regarding the user, includes obtaining content items satisfying a search of information on the Internet by a first user. The content items are ranked as a function of the information in the user profile of the first user such that the content items which are related to the information in the user profile of the first user are ranked higher than the content items which are unrelated to the information in the user profile of the first user. The content items according to ranking are then transferred to a display of the first user via the Internet such that higher ranked content items are displayed on the display prior to lower ranked content items being displayed on the display.

15 Claims, 1 Drawing Sheet

(56) References Cited

U.S. PATENT DOCUMENTS

| | | |
|---|---|---|
| 2006/0224608 A1 | 10/2006 | Zamir et al. |
| 2007/0118802 A1 | 5/2007 | Gerace et al. |
| 2009/0055435 A1 | 2/2009 | Kiviluoto et al. |
| 2010/0169297 A1 | 7/2010 | Haveliwala et al. |

* cited by examiner

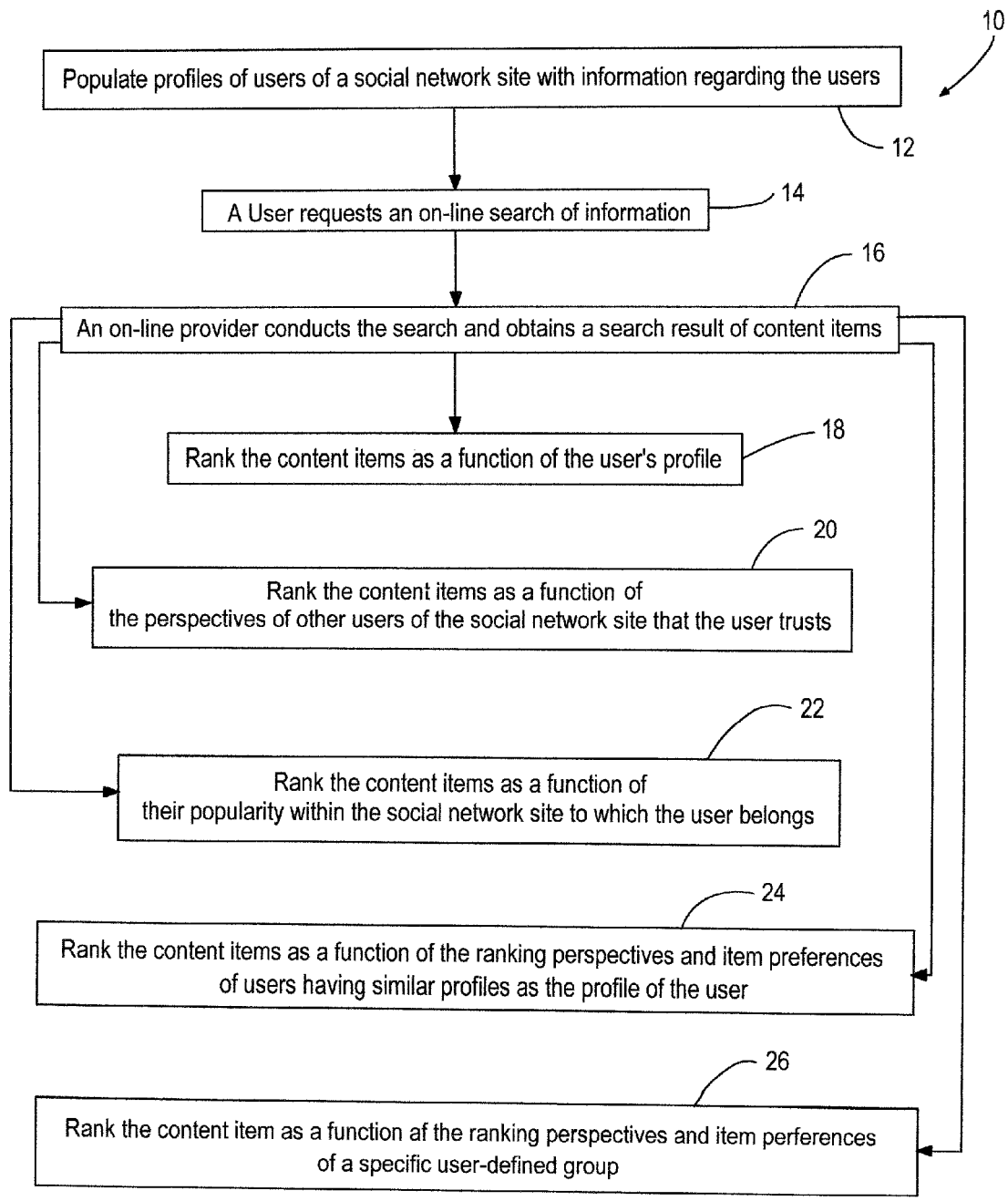

METHOD OF RANKING SEARCH RESULTS PRESENTED TO A USER OF A SOCIAL NETWORK SITE

CROSS-REFERENCE TO RELATED APPLICATIONS

This application is a continuation of U.S. application Ser. No. 12/640,092, filed Dec. 17, 2009, now U.S. Pat. No. 8,019, 743; which is a continuation of U.S. application Ser. No. 11/699,957, filed Jan. 30, 2007, now U.S. Pat. No. 7,657,523; which claims the benefit of U.S. Provisional Application No. 60/780,912, filed Mar. 9, 2006; which are incorporated by reference.

BACKGROUND OF THE INVENTION

1. Field of the Invention

The present invention generally relates to requesting, obtaining, navigating, presenting, organizing, etc., on-line (i.e., Web, Internet, etc.) search results. More particularly, the present invention relates to ranking search results presented to an on-line user as a function of perspectives of relationships trusted by the user.

2. Background Art

A social network site is an on-line (i.e., Web, Internet, etc.) site that provides a virtual community for on-line users (i.e., user members). Social network site users interact and communicate with one another via blogging, instant messaging, posting messages, e-mailing, etc., about shared interests and points of discussion. Social network site concepts and features are described in U.S. Patent Application Publication No. 2005/0177385 (entitled "Method and System for Customizing Views of Information Associated with a Social Network User") which is hereby incorporated by reference in its entirety.

Each user of a social network site has a user profile. A user populates its user profile with general and personal information of the user. For example, a user profile of a user may include: aliases; contacts (e-mail address, etc.); residence; age; interests (sports, religion, hobbies, etc.); occupation; gender; marital status; list of other users of the social network site who are friends, family, co-workers, colleagues, etc.; on-line and off-line group memberships or affiliations; strength of relationships with other users of the social network site; etc.

As such, some users of social network sites have similar profiles in that, for example, they share the same occupation, have the same interests, belong to the same group, etc. Accordingly, these users have trusted relationships with one another in that they have something in common. These trusted relationships can strengthen as these users communicate with one another. Likewise, users who have similar profiles in that they are friends, family, co-workers, colleagues, etc., of one another have trusted relationships as they are likely to be familiar with one another. Even if such users are strangers these users still have trusted relationships as they belong to the same group and are likely to know other users in the group who know the users that are strangers. Again, these trusted relationships can strengthen as these users communicate with one another. Generally, people such as users of social network sites value the opinions of other people that they trust and that have similar interests or tastes to themselves (i.e., those people with which they have trusted relationships).

In addition to enabling social network sites, Internet providers enable users to perform on-line searches to locate desired information. In operation, an on-line search provider presents the search results to the user in a numerical order. If there is a relatively large number of search results, then the provider organizes the search results into groups in which a first group is presented to the user, then a second group, and so on. The provider may organize the search results into numerical order and groups based on factors which are not necessarily in the interest of the user. For example, the provider may place search results associated with a customer of the provider higher than other search results even though the other search results appear to contain the desired information, whereas the search results associated with the customer do not. Furthermore, some of the search results may appear to contain the desired information even though they do not.

As such, the desired information may be included in the search results but the user does not actually obtain the desired information because: the desired information is presented in a later group and the user gives up reviewing the search results before reaching this group; the user confuses information in the search results as being the desired information; other information in the search results fraudulently or inadvertently appears to be the desired information; etc. Additionally, the user may not want to rely on the results obtained as they are not familiar with the source or feel that the source may be biased, for example, a company promoting its own products.

As an example of on-line searching for 'trusted' product, service, or web site information in its current form, an on-line user investigates a product of interest to the user in accordance with the following paradigm. First, the user conducts a search of on-line content containing or related to a 'Keyword(s)' identifying the product of interest. For example, the keyword is 'digital camera' and the product of interest is a digital camera. In response, an on-line provider searches for on-line content which is related to digital cameras. As can be expected, much on-line content is related to digital cameras. As such, the provider organizes the located content (i.e., the search results) into numerical orders and groupings and then presents same to the user. Typically, entries of titles and short descriptions of the presented content are initially presented to the user who, in turn, may 'click' on an entry to obtain the full document, web site, etc., associated therewith. For example, the clicked content contains reviews submitted by other people regarding certain types of digital cameras. The user may then read or access the clicked content to read reviews provided by others regarding digital cameras.

One problem with this scenario of on-line searching in its current form is that the user has no way of knowing whether the people writing the reviews are indeed being truthful of their assessment, are actually knowledgeable consumers, have a bias (are employees), have the same likes or dislikes as the user, etc. It would be desirable if the entries of the search result which have reviews written by people having some sort of shared interest as the user were presented (i.e., ranked) at the top of the search result listing for the user. More particularly, it would be desirable if the entries of the search result which have reviews deemed popular and/or trusted and/or authoritative by other users that the user trusts (i.e., other users with which the user has a trusted relationship and thereby respects their preferences) were presented (i.e., ranked) at the top of the search result listing for the user. Likewise, it would be desirable if the entries of the search result which are somehow related to a profile of the user were presented (i.e., ranked) at the top of the search result listing for the user. Likewise, it would be desirable if the entries of the search result which are somehow related to preferences of a group to which the user belongs were presented (i.e., ranked) at the top of the search result listing for the user. The present invention enables such desirable features.

As another example of the problem associated with on-line searching in its current form, consider a web site directed to hotels. Such a web site includes reviews of hotels written by people. A problem for the user when reading the reviews is that the user has no idea of whether the reviews are bogus. For instance, a hotel may encourage a person with an incentive to write a flattering review of the hotel. Likewise, the user reading a review of a hotel has no idea on whether the person writing the review has the same likes or dislikes as the user. That is, the user does not know how much the user has in common with the person writing the review. It would be desirable if the reviews which were written by people having something in common with the user and/or the reviews deemed popular by other users that the user trusts and/or the reviews which are somehow related to preferences of a group to which the user belongs were presented (i.e., ranked) at the top of the review list for the user. Again, the present invention enables such desirable features.

In sum, the current paradigm for a user to learn about a product of interest to the user is the user (a) conducting a search to locate information regarding the product; (b) finding reviews about the product in the located information; and (c) reading the reviews. The current paradigm can be termed as a "search" and, as indicated above, generally suffers from the problem of being carried out without using perspectives and preferences of people that the user trusts for the search and/or without using perspectives and preferences of the user him/herself. More particularly, the current paradigm can be termed as a "search and review" whereas it is desirable to have a paradigm which has the characteristic of "review the search".

SUMMARY OF THE INVENTION

In general, the present invention expands the current paradigm of a user "search" ("search and review") to the concept of a user "social search" ("review the search") such that a search of on-line (i.e., Web, Internet, etc.) content is carried out using perspectives and preferences of relationships trusted by the user.

Accordingly, it is an object of the present invention to provide a method and system for ranking or filtering on-line search results presented to a user as a function of perspectives of relationships trusted by the user.

It is another object of the present invention to provide a method and system for providing a 'structured social search' which allows navigation and presentation of on-line search results in a social network based format on the perspectives of trusted relationships.

It is a further object of the present invention to provide a method and system for navigating and presenting ranked structured social search information which is mapped against various categories of user-defined and/or non user-defined criteria associated with a social network user in order to provide customized views of the ranked structured social search information to the user.

It is still another object of the present invention to provide a method and system which organizes on-line information hierarchically in a taxonomy that allows navigation through a ranked structured search of the information where the ranking is determined by popularity within a social network.

It is still a further object of the present invention to provide a method and system which organizes on-line information hierarchically so that a ranking within the hierarchical structure can be driven by the perspectives and preferences of specific user-defined groups.

In general, the present invention advantageously employs the social network concept that an individual's on-line personal network of friends, family, colleagues, co-workers, etc., and the subsequent connections within those networks, can be used to find more relevant perspectives when searching for on-line information because individuals are more likely to trust and value the opinions from people they know than the opinions of complete strangers. The present invention uses the on-line social network ability of allowing its user members to group their connections within their specified user-defined categories by using those connections such that users receive recommendations and referrals from other user members (i.e., people) that they trust and believe to have similar tastes to themselves.

Accordingly, in carrying out the above objects and other objects, the present invention provides a method and system for navigating and presenting ranked structured social search information, mapped (i.e., filtered) against various categories of user-defined and/or non user-defined information associated with a social network user to provide customized views of the ranked structured social search information to the user. The user-defined criteria may also be based on user-defined preferences, user-defined profile attributes, group memberships, strength of relationships, degrees of separation, as well as criteria based at least in part on other affinities and the like. Such publicly available relationship criteria may then be extended to first, second, third, and fourth degree linking. The non user-defined criteria may include navigating the structured social search information using the ranking perspectives and item preferences of other users of the social network who have similar user profiles as the user. Whereas, the profile attributes are user defined, the degree to which they are similar to other profile attributes is determined by the application itself. The application determines which social network site users are similar based on various user profile data entries.

In an embodiment, the present invention provides a method of ranking search results presented to a user of a social network site on the Internet. Each user of the social network site has a user profile with information regarding the user. The method includes obtaining content items satisfying a search of information on the Internet by a first user of the social network site. The content items are organized as a function of at least one of the user profiles for presentation of the content items in a list to the first user.

A structured social search in accordance with the present invention allows navigation and presentation of on-line search results in a social networks based format on the perspectives of trusted relationships. This can include the perspectives of trusted connections or some other affinity (i.e., friends, family, contacts, hobbies, etc.) groups. This relates to the concept of a social network growing its networks to include more than just volumes of connections by making those connections definable, accessible, and searchable so that user members relate to their connections on a more valuable level.

Primary though to social network users are their directed trusted relationships. People increasingly rely on their trusted relationships. Many on-line searches performed by users to find desired information do not result in the users finding the desired information. Additionally, many purchases of goods and services by users are driven by personal recommendations from trusted relationships. As such, an idea behind the present invention is to harness trusted relationships in a number of ways as set forth below.

The present invention can organize on-line information hierarchically (category, sub-category, and item) in a taxonomy that allows navigation through a ranked structured search of the information where the ranking is determined by popularity within an entire social network. The information in these categories may include, and is not limited to, preferred product, web site, entertainment, travel, media, and other choices.

The present invention can organize on-line information so that the ranking within the hierarchical structure (category, sub-category, and item) can be driven by the perspectives and preferences of specific user-defined groups. For example, when navigating the hierarchical structure based on the perspectives of first degree trusted relationships (e.g., 'friends' or a group of direct trusted connections), then the item rankings are based on the item preferences within this group. Consequently, the user member of the social network site is able to navigate the structured search information using the perspective of the 'friends' group. That is, the present invention filters on-line information for a user as a function of the preferences of a group that the user belongs. More than likely, the user trusts the preferences of the group to which the user belongs. As a result, the on-line information is presented in a structured social search format.

Using 'sports fans' as another example, when navigating the hierarchical structure based on the perspectives of sports fans, then the item rankings are based on the item preferences within this group. Consequently, the user member of the social network is able to navigate the structured search information using the perspectives of sports fans. A benefit of this is seeing the most popular and preferred items, sites, travel options, local restaurants, etc. within a group of people that the user member trusts. The user member can also expand this to see the most popular selections within a class that the user member predetermines (i.e., the user member's 'buddies' as opposed to the user member's 'family') as a user member may value the opinions of different classes of the user member's network for different categories (i.e., friends for movies, family for home and garden needs, etc.). Therefore, user members are able to join groups with similar interests. The user members can also create a filing system for their networks to enable them to see the most popular lists for different classifications within their networks (friends, family, coworkers, etc.) and choose which information to share with each classification.

The present invention provides for the ability to link the organized information via rss, subscription, and/or other electronic communications to other third parties such as third party providers and suppliers. This allows providers to export or import individual favorite lists in specific categories for fulfillment or marketing purposes (for example, a DVD retailer may want access to a person's favorite movies to offer discounts or special offers on DVDs).

The present invention can enable any sub-group within a social network to function within the larger social network or operate independently of the aforementioned social network with private or public membership thus creating an entirely separate social network. As a result, a company can offer volume purchase discounts to the members of the public or private extended social network. As such, the company will be able to target a specific group with interest in their products and offer them special discounts, etc., as a group or individually within the group.

The present invention can enable user member connections to be designated as trusted network connections and then navigates and delivers search results using the perspectives and preferences of the trusted user member connections.

The present invention can use degrees of separation from trusted members as a means of establishing network authenticity. As such, establishing a connection with a friend of a trusted friend gives a user member a more valuable extended network.

BRIEF DESCRIPTION OF THE DRAWINGS

FIG. 1 illustrates a flow chart illustrating general operation of a method and system in accordance with the present invention.

DETAILED DESCRIPTION OF THE PREFERRED EMBODIMENT(S)

Referring now to FIG. 1, a flow chart 10 illustrating general operation of the method and system in accordance with the present invention is shown. In general, each user of a social network site on the Internet provides information to the social network site regarding the user. The information provided by each user populates the user profile associated with the user as indicated in block 12.

The information of a user profile includes general and personal information of the user. For example, a user profile of a user may include: aliases; contacts (e-mail address, etc.); residence; age; interests (sports, religion, hobbies, etc.); occupation; gender; marital status; list of other users of the social network site who are friends, family, co-workers, colleagues, etc.; on-line and off-line group memberships or affiliations; strength of relationships with other users of the social network site; etc. Further, in accordance with the present invention, a user profile of a user may include: a list of the user's favorite items such as products; a list of the user's favorite product manufacturers; a list of the user's favorite retailers; a list of the user's favorite service providers; a list of the user's favorite web sites and web pages; a list of the user's favorite reviews of products and/or services posted on web sites by others; etc.

In operation, a user requests an on-line search of information as indicated in block 14. An on-line provider conducts the search and obtains a search result as indicated in block 16. The search result is a list of on-line content which satisfies the search. Each distinct unit (e.g., web site, web page, etc.) of on-line content is referred to as a content item. Subsequently, the search result is organized such that the content items are presented to the user in some sort of order. In accordance with the present invention, the search result is ranked or filtered such that the content items which are most relevant to the user are presented at the top of the list of content items. As explained below, the content items are ranked or filtered in anyone of different ways including any combination of such ways in order to accommodate this goal of presenting the most relevant content items to the user.

In one way, the content items are ranked or filtered as a function of the user profile of the user as indicated in block 18 such that the content items which are related to the user's profile are placed at the top of the search result list. For example, assume the user requested an on-line search of information for televisions and, as such, the search result is a list of on-line content somehow related to televisions. In this case, if the user's profile includes the identity of a favorite retailer (and/or manufacturer), then the content items related to televisions which are also related to the favorite retailer (and/or favorite manufacturer) are placed towards the top of the search result list. Likewise, if the user's profile indicates that the user likes to go to the movies, then the content items related to televisions which are directed to in-home movie theaters are placed towards the top of the search result list. Further, in this example, the content items related to televisions which are also related to the favorite retailer (and/or favorite manufacturer) and in-home movie theaters is placed at the top of the search result list.

In another way, the content items are ranked or filtered as a function of the perspectives of other users of the social network site that the user trusts as indicated in block 20 such that the content items which are related to the perspectives of the other users of the social network site are placed at the top of the search result list. For example, assume the user requested an on-line search of information for car rental agencies in order to lease a car in another city where the user's employer has a presence and, as such, the search result is a list of on-line content somehow related to rental car agencies. In this case, if the user's profile includes the identities of the user's coworkers who are also users of the social network site and these users indicate favorite car rental agencies (because perhaps they have already had to rent a car in that city), then the content items related to rental car agencies which are also related to the favorite rental car agencies of the user's coworkers are placed towards the top of the search result list.

In another way, the content items are ranked or filtered as a function of their popularity within the social network site to which the user belongs as indicated in block 22 such that the content items which are popular to the users of the social network site are placed at the top of the search result list. For example, assume the social network site is a dating site and the user is a young man performing an on-line search to request ideas on where to take a young woman on their first date for dinner. In this case, the content items related to the favorite restaurants of the other users of the dating site (or perhaps the favorite restaurants of the other young women users of the dating site) are placed at the top of the search list.

In another way, the content items are ranked or filtered as a function of the ranking perspectives and item preferences of users having similar profiles as the profile of the user as indicated in block 24 such that the content items which satisfy the ranking perspectives and item preferences of users having similar profiles are placed at the top of the search result list. For example, assume the user requested an on-line search for multi-vitamins and that the user's profile indicates that the user is a sixty year old woman. In this case, the content items related to multi-vitamins which are also related to the most favorite multi-vitamins of other users of the social network site who are women near the age of sixty are placed at the top of the search result list.

In another way, the content items are ranked or filtered as a function of the ranking perspectives and item preferences of a specific user-defined group as indicated in block 26 such that the content items which satisfy the ranking perspectives and item preferences of the user-defined group are placed at the top of the search result list. For example, assume the user requested an on-line search of information for tennis racquets and, as such, the search result is a list of on-line content somehow related to tennis racquets. Further assume that the user and other users of the social network site indicate tennis as being an activity they play and at least a group of the other users identify their favorite tennis racquets. In this case, the content items related to tennis racquets which are also related to the most favorite tennis racquets among the group of users is placed at the top of the search result list.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method of presenting search results to a user of a social network site on the Internet, wherein users of the social network site each have a user profile with information regarding the user, wherein the user profile of each user includes information identifying other users of the social network site who the user trusts, the method comprising:
    obtaining, by a server hosting the social network site on the Internet, the user profiles of users of the social network site;
    obtaining, by the server, content items other than any of the user profiles satisfying a search of information on the Internet other than the social network site by a first user of the social network site, wherein the first user has a user profile with information regarding the first user including information identifying other users of the social network site who the first user trusts;
    ranking, by the server, the content items as a function of the information in the user profile of the first user and the information in the user profiles of users trusted by the users trusted by the first user such that the content items which are related to the information in the user profile of the first user and the information in the user profiles of users trusted by the users trusted by the first user are ranked higher than the content items which are unrelated to the information in the user profile of the first user and the information in the user profiles of the users trusted by the users trusted by the first user; and
    transferring from the server to a display of the first user via the Internet the content items according to the ranking such that higher ranked content items are displayed on the display prior to lower ranked content items being displayed on the display.

2. The method of claim 1 wherein the information in the user profile of each user includes an interest of the user, wherein:
    ranking the content items includes ranking the content items as a function of the information in the user profiles of users having the same interest as the first user such that the content items which are related to the information in the user profiles of users having the same interest as the first user are ranked higher than the content items which are related to the information in the user profiles of users having a different interest than the first user.

3. The method of claim 1 wherein the information in the user profile of each user includes a group membership of the user, wherein:
    ranking the content items includes ranking the content items as a function of the information in the user profiles of users having the same group membership as the first user such that the content items which are related to the information in the user profiles of users having the same group membership as the first user are ranked higher than the content items which are related to the information in the user profiles of users having a different group membership than the first user.

4. The method of claim 1 wherein the information in the user profile of each user includes an occupation of the user, wherein:
    ranking the content items includes ranking the content items as a function of the information in the user profiles of users having the same occupation as the first user such that the content items which are related to the information in the user profiles of users having the same occupation as the first user are ranked higher than the content items which are related to the information in the user profiles of users having a different occupation than the first user.

5. The method of claim 1 wherein the information in the user profile of each user includes a gender of the user, wherein:
ranking the content items includes ranking the content items as a function of the information in the user profiles of users having the same gender as the first user such that the content items which are related to the information in the user profiles of users having the same gender as the first user are ranked higher than the content items which are related to the information in the user profiles of users having a different gender than the first user.

6. The method of claim 1 wherein the information in the user profile of each user includes a marital status of the user, wherein:
ranking the content items includes ranking the content items as a function of the information in the user profiles of users having the same marital status as the first user such that the content items which are related to the information in the user profiles of users having the same marital status as the first user are ranked higher than the content items which are related to the information in the user profiles of users having a different marital status than the first user.

7. The method of claim 1 wherein the information in the user profile of each user includes an age of the user, wherein:
ranking the content items includes ranking the content items as a function of the information in the user profiles of users having a similar age as the first user such that the content items which are related to the information in the user profiles of users having a similar age as the first user are ranked higher than the content items which are related to the information in the user profiles of users having a dissimilar age than the first user.

8. The method of claim 1 wherein the information in the user profile of each user includes information identifying an employer of the user, wherein:
ranking the content items includes ranking the content items as a function of the information in the user profiles of users having the same employer as the first user such that the content items which are related to the information in the user profiles of users having the same employer as the first user are ranked higher than the content items which are related to the information in the user profiles of users having a different employer than the first user.

9. The method of claim 1 wherein the information in the user profile of each user includes information identifying other users known by the user, wherein:
ranking the content items includes ranking the content items as a function of the information in the user profiles of users known by the first user such that the content items which are related to the information in the user profiles of users known by the first user are ranked higher than the content items which are unrelated to the information in the user profiles of the users known by the first user.

10. The method of claim 1 wherein:
ranking the content items includes ranking the content items as a function of popularity with the users of the social network site such that the content items which are popular with the users are ranked higher than the content items which are not popular with the users.

11. The method of claim 1 wherein the information of the user profile of the first user includes information identifying at least one of age, interests, activities, occupation, gender, marital status, and group memberships of the first user, wherein:
ranking the content items includes ranking the content items as a function the information in the user profile of the first user such that the content items which are related to at least one of age, interests, activities, occupation, gender, marital status, and group memberships of the first user are ranked higher than the content items which are unrelated to at least one of age, interests, activities, occupation, gender, marital status, and group memberships of the first user.

12. A method of presenting search results to a user of a social network site on the Internet, wherein users of the social network site each have a user profile with information regarding the user and information identifying other users who are associated with the user, the method comprising:
obtaining, by a server hosting the social network site on the Internet, the user profiles of users of the social network site;
obtaining, by the server, content items other than any of the user profiles satisfying a search of information on the Internet other than the social network site by a first user of the social network site, wherein the first user has a user profile with information regarding the first user including information identifying other users of the social network site who are associated with the first user;
ranking, by the server, the content items as a function of the information in the user profiles of the users associated with the users who are associated with the first user such that the content items which are related to the information regarding the users associated with the users associated with the first user are ranked higher than the content items which are unrelated to the information regarding the users associated with the users associated with the first user; and
transferring from the server to a display of the first user via the Internet the content items according to the ranking such that higher ranked content items are displayed on the display prior to lower ranked content items being displayed on the display.

13. The method of claim 12 wherein:
users who are associated with the first user include users known by the first user.

14. The method of claim 12 wherein:
users who are associated with the first user include users having the same occupation as the first user.

15. The method of claim 12 wherein:
users who are associated with the first user include users having the same interests or hobbies as the first user.

* * * * *